United States Patent [19]

Handler

[11] Patent Number: 5,004,192
[45] Date of Patent: Apr. 2, 1991

[54] SIDE SUPPORTED CABLE TRAY

[76] Inventor: Isidore Handler, 2960 Kinloch Rd., Wantagh, N.Y. 11793

[21] Appl. No.: 227,377

[22] Filed: Aug. 2, 1988

[51] Int. Cl.⁵ .................................................. F16L 3/00
[52] U.S. Cl. ...................................... 248/49; 174/101; 248/68.1
[58] Field of Search ................ 248/49, 68.1; 174/68.3, 174/97, 101; 52/221, 278

[56] References Cited

U.S. PATENT DOCUMENTS

| | | | |
|---|---|---|---|
| 2,023,433 | 12/1935 | McConnell | 174/68.3 X |
| 3,042,351 | 7/1962 | Du Bois | 248/49 |
| 3,727,644 | 4/1973 | Kagan | 174/101 X |
| 3,927,698 | 12/1975 | Johannsen | 174/101 X |
| 4,391,426 | 7/1983 | Gothberg | 248/49 |
| 4,857,670 | 8/1989 | Frank et al. | 174/68.3 |

FOREIGN PATENT DOCUMENTS

| | | | |
|---|---|---|---|
| 25369 | 8/1972 | Australia | 174/101 |
| 246826 | 5/1966 | Austria | 174/97 |
| 271891 | 6/1988 | European Pat. Off. | 174/97 |
| 2232011 | 1/1974 | Fed. Rep. of Germany | 174/97 |
| 2326348 | 12/1974 | Fed. Rep. of Germany | 174/97 |
| 2648089 | 4/1978 | Fed. Rep. of Germany | 174/68.3 |
| 2536219 | 5/1984 | France | 174/68.3 |
| 959206 | 5/1964 | United Kingdom | 248/49 |
| 1354484 | 5/1974 | United Kingdom | 248/49 |
| 1410423 | 10/1975 | United Kingdom | 174/101 |

Primary Examiner—David L. Talbott
Attorney, Agent, or Firm—Ostrolenk, Faber, Gerb & Soffen

[57] ABSTRACT

A section of a cable tray is adapted for being mounted on a vertical surface, like a wall, a line of columns or a soffit. The cable tray section includes an upper wall mounting section having an external wall part for being mounted to the wall, a lower external wall section which is indented from the upper wall section, having an inner wall which defines one wall of the tray. A space inside the wall mounting section receives a splice shunt block for attachment to an adjacent tray section. A tray floor section extends out from the inner wall of the wall mounting section. Various stiffeners are disclosed for the tray section floor. An outer wall extends up from the tray floor completing the U-shape of the tray section. The tray section may be an integral metal or plastic extrusion. Alternatively, it may be bent into shape from one or more sheets of metal. A splice shunt block joins adjacent wall mounting sections. In an alternate embodiment, the tray is comprised of a section inlcuding the wall mounting section and the tray floor. An L-shaped extension has one leg that lays over the tray floor. One edge of that leg is held at the inner wall or in a selected one of a plurality of slots defined along the tray floor. The other leg of the extension defines the outer upstanding wall of the tray.

24 Claims, 5 Drawing Sheets

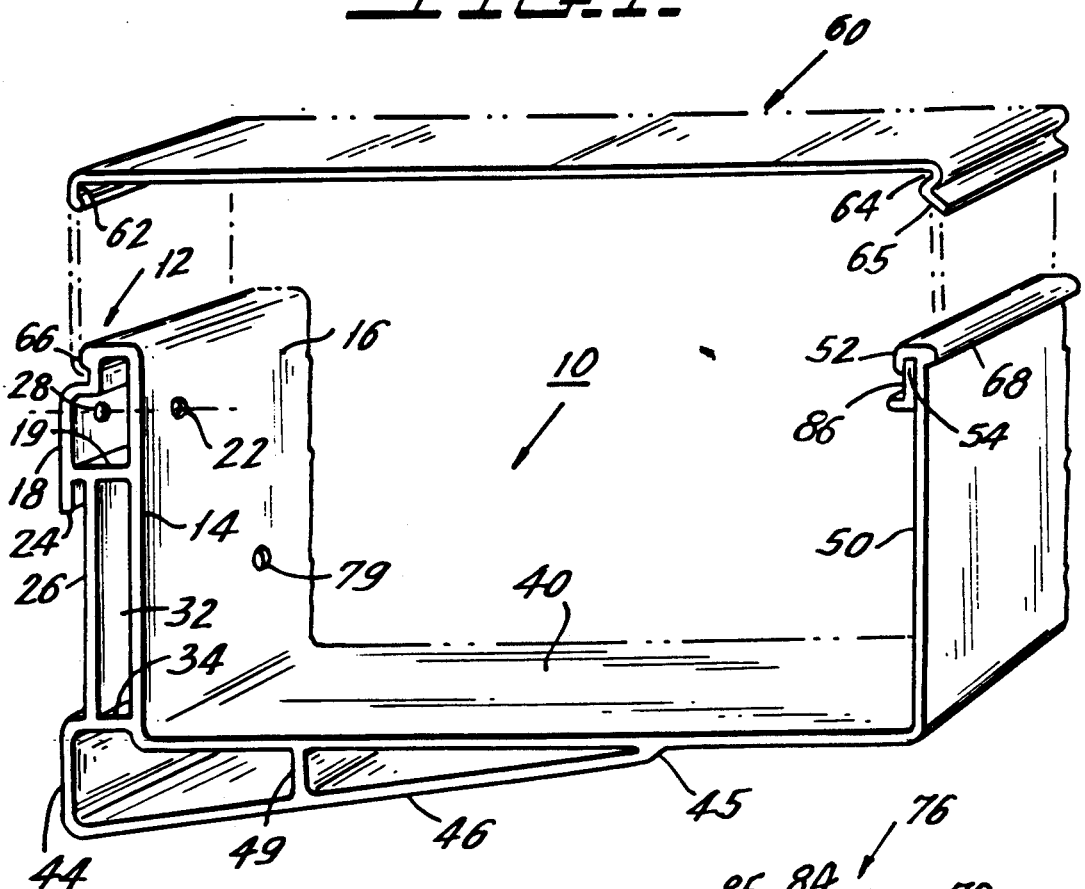

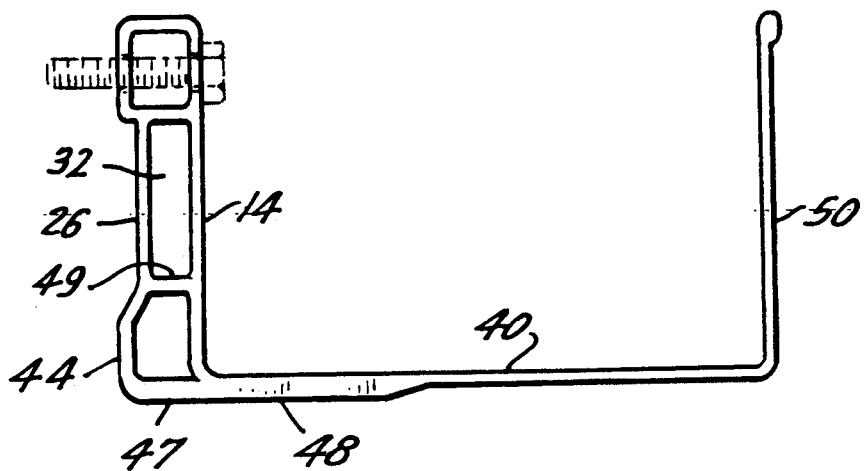
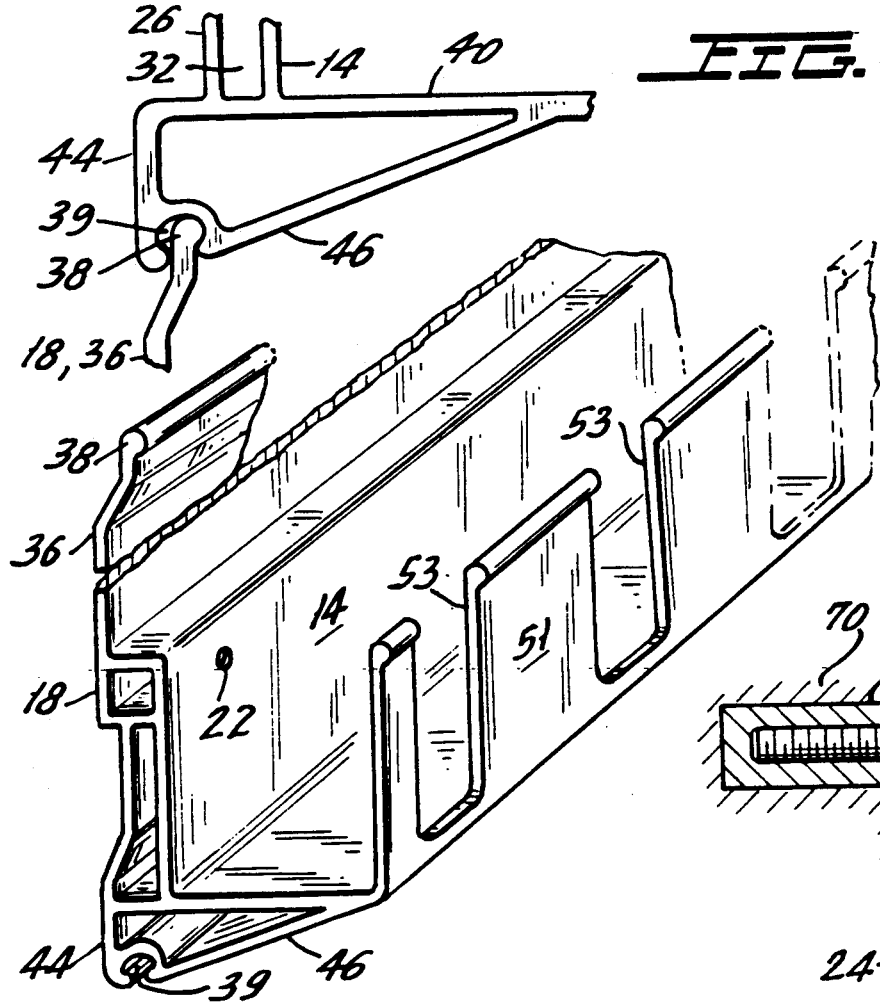

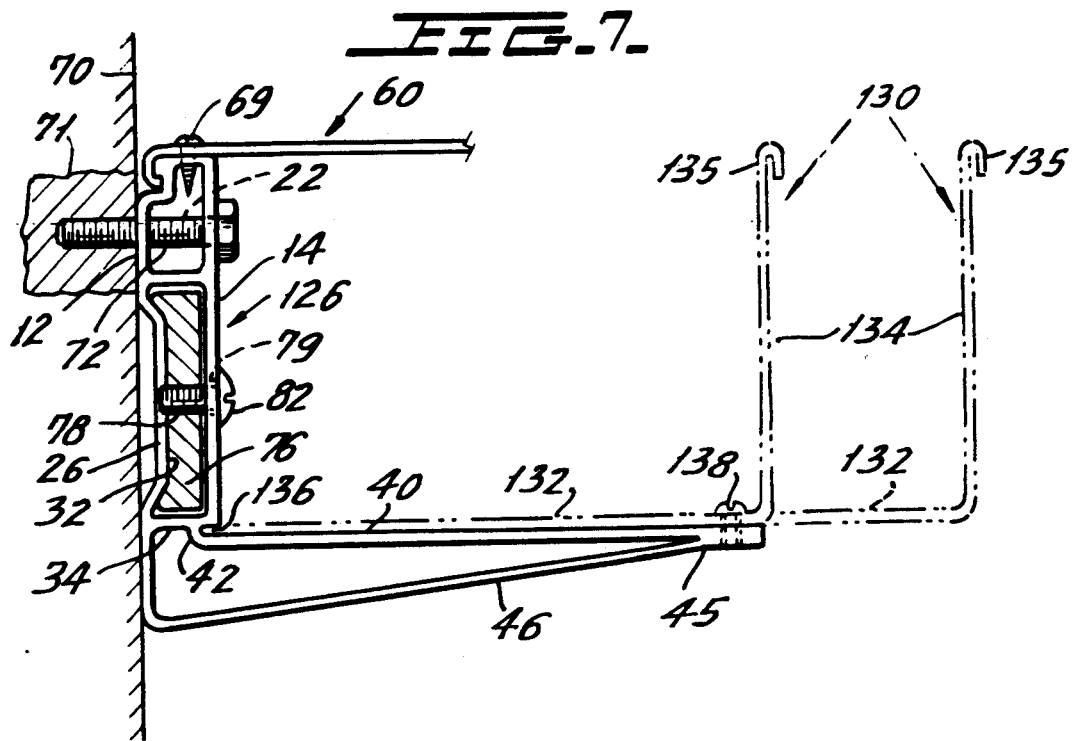
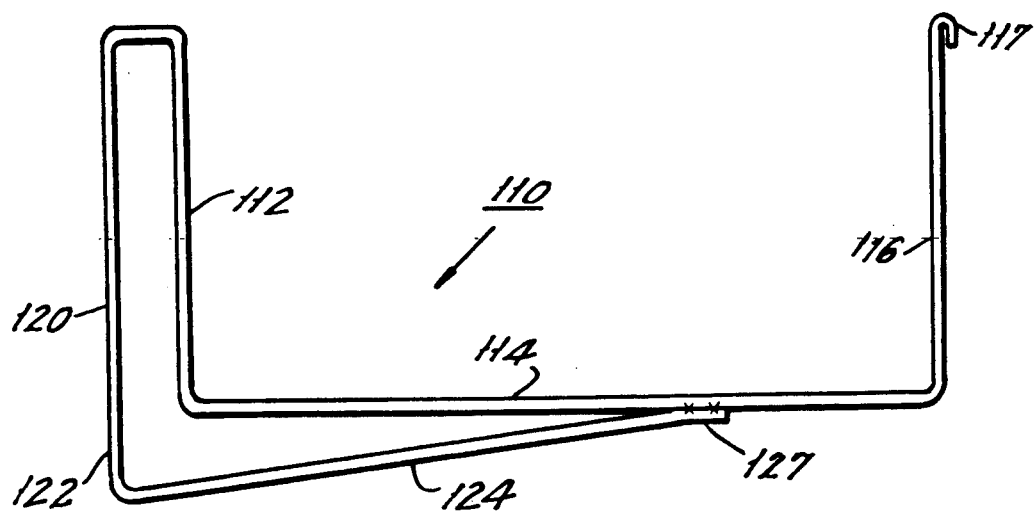

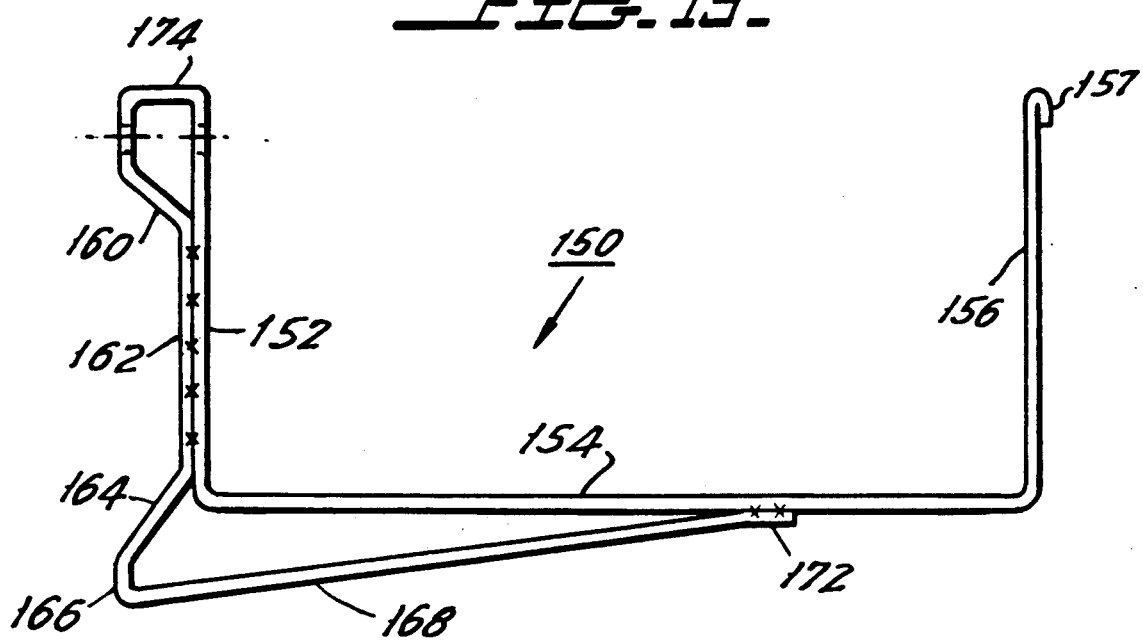
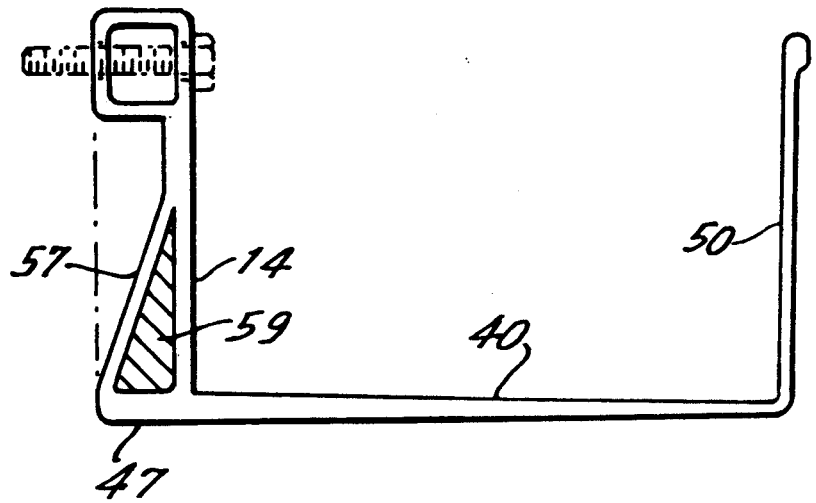

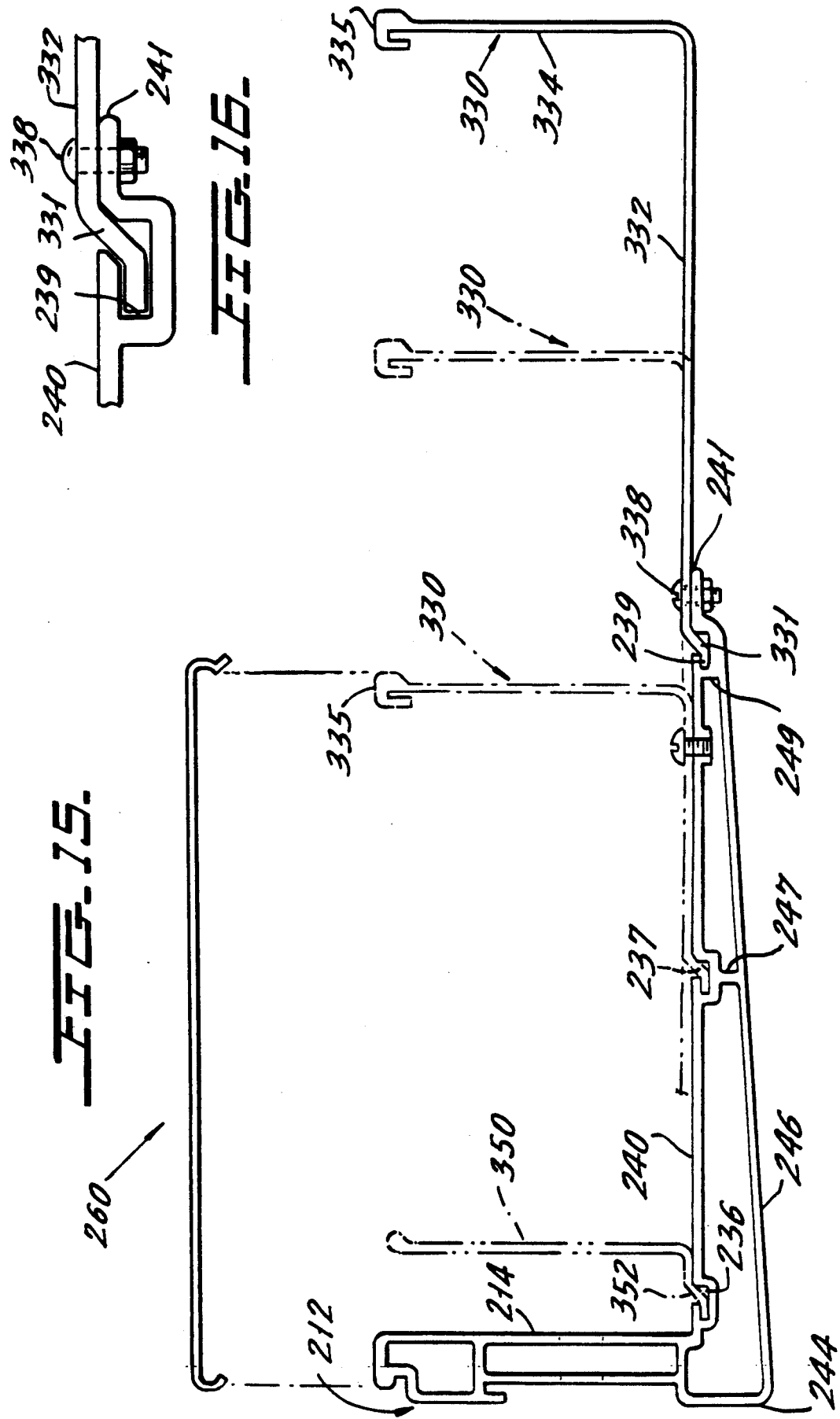

SIDE SUPPORTED CABLE TRAY

BACKGROUND OF THE INVENTION

The present invention relates to a cable tray used for supporting an elongate run of cables in a building. Electric power cables, communications cables, computer cables, signal cables, and the like cables typically are supported either at or above a ceiling or at or beneath a floor as they pass from room to room or area to area in a building. The cables are supported in an elongate cable tray which defines the pathway for the cables. Cable trays take various forms, but generally comprise an open top receptacle, e.g. a U-shaped receptacle, of a width sufficient to carry all of the cables, and the tray follows a continuous pathway, with periodic bends and turns. The cable trays may be suspended from above, may be supported from below, e.g. on short feet, rods or outboard floor supports, and may be secured to a wall or vertical surface through the use of brackets. The present invention is particularly directed to a side supported cable tray which is in itself mountable to a wall.

Fabrication and later installation of a cable tray involves direct labor costs and direct material costs, which obviously should be kept at a minimum, while an adequately strong, light enough in weight, variable in length and adjustable in direction cable tray is produced. A material too light in weight may bend or break over the long stretches of the cable tray. A cable tray preferably has a minimum number of attachments or connections between adjacent sections or parts in order to minimize costs. A cable tray also should require a minimum number of hanging or suspension devices also in order to minimize the costs of installation.

SUMMARY OF THE INVENTION

The cable tray of the present invention is comprised of a series of cable tray sections which are arranged end to end to define an entire tray run or system. Each cable tray section has the same characteristics of the invention.

Each cable tray section of the invention includes a wall mounting section to be mounted on a vertical surface, such as a wall, a line of columns or a soffit. The wall mounting section includes an external wall which is adjacent to and is secured to the wall or surface. An internal wall spaced inwardly from the external wall defines the inner wall of the cable tray section. These walls define an open space, generally rectangular in cross-section, which receives a splice shunt block that projects into the corresponding open space at the butting end of an adjacent cable tray section. The shape of the wall mounting section with the external wall spaced from the inner wall of the cable tray section and elements joining those walls strengthen it and give it a truss-like design, so that it is unlikely to bend.

In an alternate arrangement, a cable tray section may be suspended from a hanger or may be suspended directly beneath another cable tray section.

For reducing the width of the wall mounting section, the external side of the space for the splice shunt block is indented inwardly from the part of the external wall that is secured to the wall or surface, providing a smaller cross-section space for the splice shunt block and also providing a more advantageous twopoint contact of the external wall of the tray section with the wall or surface to which it is mounted. This reduces the possibility that the tray section might rock.

A splice shunt block extends into the open spaces therefor at the butting ends of adjacent tray sections and mechanically connects and aligns them and also defines a pathway for conducting an undesired leakage or fault current to ground. To eliminate undesired leakage or ground fault connections, in one version the cable tray sections are comprised of metal and there are periodic ground connections to them. In another version, the tray sections are of plastic. Here a separate ground wire may be installed inside the tray, if needed.

From the bottom of the wall mounting section of the cable tray section, there depends a vertical extension. At the bottom of that extension is attached a strut which extends diagonally up to the underside of the floor of the tray section, strengthening the tray section, so that less material may be used and a sufficiently rigid supporting tray is defined. A rib may be defined to extend between the strut and the underside of the floor of the tray section approximately at the middle of the length of the strut. This enlarges the moment of inertia of the floor, and particularly the moment of inertia of the combination of the floor with the strut, and makes them operate like a truss, strengthening the floor without using excessive material.

An alternative for strengthening the tray is to thicken the tray floor partially across the width of the tray in the direction out from the wall mounting section.

Another alternative is to start with a greater thickness tray section floor and gradually reduce the thickness of the tray floor across the width of the tray, with the floor being thickest at the wall mounting section and gradually thinning to the outer wall. This gradual reduction in thickness conforms proportionally with the change in the bending moment across the width of the floor of the tray. All of these and other designs of the cable tray section floor have the effect of thickening and strengthening the floor and increasing its moment of inertia to make the floor, as well as the support for the floor, like a truss, which is less likely to bend or deform.

Extending outward from the wall mounting section is a surface which defines the floor of the tray. In a first preferred embodiment, the tray floor extends out to an upstanding outer wall of the tray which stands up from the tray floor, whereby the tray is generally U-shaped in cross-section.

The outer wall of the tray section is unitary and unbroken along its length, especially if the tray section is extruded. But it may be formed with spaced gaps or notches of various widths, which allow cable to enter and exit the tray sections.

The top edges of the inner and outer walls of the tray have elongate ridges which receive a cover that is snapped over the ridges, should it be desired to close the top of the tray. At the outer wall, means are provided for joining the butting ends of the outer walls of adjacent tray sections in order to keep the row of tray sections straight and in line. In particular, a joining tab is defined at least at the ends of the outer walls, and the tabs of neighboring sections define a slot which receives a connecting piece between adjacent butting ends.

In one preferred embodiment, the entire cable tray section is an integral, one-piece extrusion of aluminum. In a modification, the tray is an integral, one-piece extrusion of a stiff plastic.

In an alternate embodiment, the cable tray section is comprised of a single piece of sheet metal which is bent to define all of the necessary elements of the cable tray section.

In a further embodiment of the invention, the cable tray section is comprised of two basic parts. Either or both of them are extruded and are of extruded aluminum or of extruded plastic. The first part of the cable tray section defines the wall mounting section and a significant part of the tray floor, at least extending out from the wall beyond the place where the supporting strut reaches to the tray floor. The second part of the cable tray section comprises a generally L-shaped insert. One leg of the L is supported on the tray floor of the first part of cable tray section. The other leg of the L stands up from the first leg and defines the outer wall of the cable tray section. The two parts of the cable tray section are secured together.

In a preferred arrangement, a small slot is defined between the bottom of the wall mounting section and the tray floor. The edge of the one leg of the L-shaped second part of the cable tray section is disposed in that slot, thereby securing the two parts of the cable tray section together. That edge of the one leg is hooked so that it can be withdrawn from the slot by tipping the L-shaped part to free the hook from the slot. Additional fastening means are provided to firmly secure the parts together. This could include a hook defined on the edge of the one leg of the second part and a shaped slot in the first part for receiving the hook.

In another arrangement, a plurality of small, L-shaped slots are defined in and extend along the floor of the wall mounting section, spaced at intervals outward from the inner wall of the mounting section. The slot extends inward toward the inner wall. A flange defined on and particiularly defined at the edge of the one leg of the L-shaped second part is installed in any one of the L-shaped slots, and this determines the total width of the completed cable tray section. This allows for expansion of the cable tray section to a selected size. Furthermore, the variability of the size of the cable tray section by selection of a particular L-shaped slot permits the supplier of the cable tray to maintain an inventory having a smaller variety of parts for providing the user with cable tray sections of varying widths.

The slots in the floor of the cable tray section may also receive an additional divider strip which may be installed in the cable tray section to divide it into at least two compartments, one at each side of the divider strip.

In various embodiments, the wall mounting section is provided with spaced apart openings along its length for receiving appropriate fastening means, such as wall mounting bolts or screws, which secure the wall mounting section to the wall surface without the wall mounting section collapsing from compression by the bolts.

Where the cable tray turns corners, the butting ends of the adjacent wall mounting sections are cut or mitered to meet at the desired angle. Appropriate connecting pieces join the butting, angled ends of the adjacent cable tray sections at both the wall mounting section and the outer wall.

Other objects and features of the present invention will become apparent from the following description of the preferred embodiments of the invention considered with the accompanying drawings.

BRIEF DESCRIPTION OF THE DRAWINGS

FIG. 1 is a perspective view of a cable tray section according to a first embodiment of the invention;

FIG. 2 is a fragment showing a first suspension technique for the cable tray section;

FIG. 3 shows an alternate design for the section of FIG. 1;

FIG. 4 is a fragment showing an alternate suspension technique for the cable tray section;

FIG. 5 is a perspective view of a modification of the section of FIG. 1;

FIG. 6 is a plan view of a turn or corner along a run of sections;

FIG. 7 illustrates a second embodiment;

FIG. 8 illustrates a splice shunt block for joining adjacent sections;

FIG. 9 illustrates a modified splice shunt block;

FIG. 10 is a view of a coupling strip;

FIG. 11 illustrates a modified third embodiment of a cable tray section;

FIG. 12 shows a modified securement technique for the tray floor extension of the second embodiment;

FIG. 13 illustrates a fourth embodiment, modifying that of FIG. 11;

FIG. 14 illustrates a fifth embodiment, modifying that of FIG. 3;

FIG. 15 illustrates a sixth embodiment, modifying that of FIG. 7; and

FIG. 16 shows a detail of FIG. 15.

DESCRIPTION OF THE PREFERRED EMBODIMENTS

The cable tray of the present invention in a first embodiment of FIG. 1 is comprised of a series of extruded cable tray sections, preferably of extruded aluminum, but also possibly of extruded plastic, materials selected to provide sufficient strength, to be light in weight and, in the case of aluminum, to conduct any leakage electric current to a ground connection. A plastic tray can carry a ground wire in it for the same purpose, if needed.

The first embodiment of a section of cable tray 10 invention comprises a complete U-shaped aluminum extrusion that defines the entirety of the cable tray section. It includes a wall mounting section 12 which is mounted to a wall, a surface, or the like. Mounting section 12 includes the internal straight vertical support wall 14, which defines the inner one of the opposite U-shaped walls of the cable tray section 10.

The upper part 16 of the wall mounting section 12 is defined at the inside of the tray by the inner wall 14 and on the outside of the tray by the external wall 18. The external wall 18 is intended to be secured against a wall or other vertical surface like 70 in FIG. 7. At appropriate spaced intervals along the extrusion of the cable tray section 10, bolt or screw openings 22 pass through the inner wall 14 and aligned openings 28 pass through the external wall 18 at the upper part 16 for receiving bolts or screws for attaching the cable tray section 10 to a wall. The bottom wall 19 of the upper part 16 strengthens it against the compression and deformation caused by the securing bolts.

Beneath the upper part 16, the external wall 18 continues straight down a short distance to define a suspension hook 24 by which the tray section 10 may be suspended from a hanger 35, as described below. Such suspension would be an alternative to bolting the wall mounting section to the wall.

Below the upper part 16, the external wall 18 is indented inward to the indented wall section 26 which extends down to the bottom of the wall mounting section 12. The indented section 26 is inward from the external wall 18 for two purposes. First, the indent of the section 26 defines just two lines of wall contact at the top 16, 18 and the bottom 44 of the wall mounting section, so that the tray section easily aligns itself to the wall 70 behind it. Secondly, an open space 32 is defined between the inner wall 14 of the cable tray and the indented wall section 26. The space 32 is adapted to receive a splice shunt 76, a short length block of metal extends into openings in the butting ends of adjacent extruded sections of the cable tray. The size and cross-section of the space 32 is selected so that the splice shunt block will have the appropriate electric resistance and conductivity for leakage current that must be conducted to a ground connection and so that the splice shunt block will be strong enough to help strengthen the cable tray against deforming and help maintain its alignment. The bottom wall 34 of the wall mounting section 12 encloses the space 32.

FIG. 2 shows an alternate cable tray suspension technique using a hanger strip 35, which is bolted at 72 to the wall plug 71 projecting into the wall 70. The bottom end of the hanger strip 35 is provided with a hook 37 that hooks under the hook 24 on the wall mounting section 12. A plurality of strips 35 may be provided at spaced apart intervals.

Beneath the bottom wall 34 is the wide floor 40 of the cable tray section. The cable tray has a selected width, such as six inches for an extruded tray. Obviously, other widths may be appropriate for an installation location due to the number and nature of the cables. The floor 40 may be spaced down from the bottom wall 34 of the section 12 to define a short height slot 42 as shown in FIG. 7. That slot accepts a metal liner for a cable tray section of the embodiment of FIG. 7, described below, as that section is not a unitary single extrusion.

In order that the cable tray itself be light enough in weight, its material is thin. To strengthen the cable tray and particularly its floor 40, a light weight stiffening strut arrangement is included in the extrusion. It includes the depending extension 44 of external wall 18, which extends below wall mounting section 12 and rests against the surface 70 on which the cable tray section is mounted, and includes the upwardly inclined strut 46 which extends, beneath the tray section floor 40, from the leg 44 nearly toward the opposite outer wall 50 of the tray section where the strut 46 meets and supports the floor 40 at intersection 45. Part way along the length of the strut 46, there is a rib 49 which connects the strut 46 to the underside of the tray section floor 40, which further stiffens that arrangement in a truss-like manner. The weight of cables in the tray applies a force that compresses strut 46, which opposes the force. The triangular cross-section supporting structure comprised of the cable tray floor 40, leg 44, strut 46 and rib 49 stiffens the floor 40 against deforming due to the width of the extruded section between the walls of the cable tray, and due to the weight of the tray and of the cables supported in the tray. Thus, the floor is supported as by a truss.

An alternative to the strut 46, as shown in FIG. 3, is to have the depending leg 44 meet the leg 47 which merges into a thickened region 48 of the tray floor 40. Thickened region 48 is obviously stiffer than the rest of the floor 40. The thickened region extends far enough across the width to resist the bending moments of the floor 40. To also stiffen the wall mounting section here and make it truss-like, there is a rib 49 between the external wall 26 and the inner wall 14 part way along their heights. Both the strut design of FIG. 1 or the thickened floor design of FIG. 3 are produced through extrusion.

A further alternative to the strut 46 and to the arrangement shown in FIG. 3, as shown in FIG. 14, is to replace the opening 32 in which the splice shunt block may be disposed with a differently shaped, here triangular, opening and to eliminate the external and outer wall separateness at 14 and 26 and additionally to replace the depending leg portion of the external wall, and instead use the arrangement shown in FIG. 14, wherein the inwardly angled strut 57 extends inwardly from the cable tray section inner wall 14 down to the other leg 47 which merges into the floor 40. This triangular arrangement, like the depending leg 44 and strut 46 of FIG. 1, increases the moment of inertia of the wall mounting section and acts like a truss for stiffening the outer wall 14. The alternate arrangement for the wall mounting section in FIG. 14 may be employed in any of the embodiments herein.

A triangular cross-section splice shunt block 59 may be installed between wall 14 and strut 57.

The alternate embodiment of FIG. 14 has another significant feature which may be substituted for that in FIG. 3. From the inner cable tray section wall 14 to the opposite outer support wall 50, the thickness of the floor 40 is gradually reduced, generally proportionally to the reduced stress and bending moment in the floor 40 in the direction further toward the outer wall 50. The leg 47, cooperating with the strut 57 and the inner wall 14, provides the basic supporting truss or brace for the floor 40.

FIGS. 4 and 5 illustrate a multiple tier arrangement, wherein one cable tray section is suspended beneath another section. In the illustrated example, the top part 36 of the external wall 18 of a tray section has a knuckle 38 that is slightly out from the mountable surface of the wall 18. The base region 44, 46 of the cable tray section above the knuckle 38 is profiled to define a knuckle receiving notch 39, which is shaped to permit introduction of the knuckle 38 and to retain it once it has been inserted.

In FIG. 1, there is an opposite outer wall 50 of the cable tray section, which stands up from the floor 40. The tray section for receiving cables is defined by and between the inner wall 14, the outer wall 50 and the floor 40.

In an extrusion, the outer wall is continuous. But, in an alternate arrangement shown in FIG. 5, the outer wall 51 has cut outs or notches 53 of the same width or of variable widths, at various intervals. These can be cut out from the completed extrusion. The notches allow cable to enter and exit that tray section.

At the top of the outer wall 50 is an inwardly turned overhang flange 52 which defines a slot 54 in which may be inserted a short-length L-shaped coupling strip 86 (FIGS. 1 and 10) or 102 (FIG. 6) that is short in length, but long enough to join the butting ends of the outer walls 50 of two adjacent sections of cable tray.

A cover 60 shown in FIG. 1 may be applied over the top of the cable tray section after the cables have been placed on the floor 40 in the tray. The cover 60 is a snap-on cover and includes snap-on, curved end clips 62 and 64 for that purpose. The clip 64 extends down to the outwardly projecting lift tab 65, which is used to raise the cover to remove it.

The upper part 16 of the wall mounting section 12 has a flange 66 defined on and extending longitudinally along its top edge over which the clip 62 is received. Correspondingly, the top edge of the outer wall 50 is provided with a longitudinally extending flange 68 over which the clip 64 is received. The flange 66 is indented in from the external wall 18 so that the cover 60 may be applied by first attaching the clip 62 at the flange 66 and then moving the cover down so that the clip 64 locks over the flange 68, and so that removal of the cover may be accomplished by first raising the clip 64 off the flange 68, using tab 65, and pivoting up the cover 60 and thereafter removing the clip 62 from the flange 66, without the cover clip 62 undesirably hitting the wall or surface 70 to which the wall 18 is mounted. If desired, a screw 69 may be used to attach the cover more permanently, e.g. to avoid undesired lifting due to vibration, wind, etc.

With reference to FIG. 7, in all of the embodiments herein, each mounting section 12 is attached to a wall or surface 70 by mounting screws 72 or like functioning devices, which pass through the upper part 16 of the section 12 and into a standard wall plug 71 or other device disposed in the wall 70.

Adjacent, butting, elongate extruded sections are joined by an installed splice shunt block 76 which is placed in the open spaces 32 of two extruded section adjacent their butting ends. In FIG. 8, the splice shunt block 76 is of metal, is of sufficient strength to hold the neighboring extrusions together and to align them and is of sufficient cross-section to have the required electric conductivity. Holes 78, 81 in the block 76 receive self-tapping screws 82 which are screwed through the internal wall 14 of the extrusion and into the splice shunt block to hold it in position. One of the holes 81 in the block 76 is elongate or oval, to accommodate different spacing tolerances of the cable tray sections and to allow the sections to be squeezed into secure abutment before tightening of the screw 82 that passes through the elongate slot 81.

FIG. 9 illustrates an alternate splice shunt block 83 which is provided with short height one way, non-removal ridges or barbs 84 on one part of the block that is installed in one of two connected cable tray sections. The abutment 85 establishes the maximum extent to which the block can be inserted.

There are holes 79 shown in FIGS. 1 and 7 which pass through the inner wall 14 of the wall mounting section and are generally aligned with the respective hole 78 or 81 of the splice shunt block 76 or 83 that is disposed in the open space 32. The hole 79 receives the above mentioned self-tapping screw 82 to secure the splice shunt block 76 or 83 to the respective section of the cable tray.

At the outer end of the tray section, a simple coupling strip 86 (FIGS. 1 and 10) may be installed in the slots 54 at the outer walls at the adjacent butting ends of two cable tray section lengths of the extrusion.

FIG. 6 shows the cable tray in two butting sections turning an internal 90° corner, that is, the tray is on the inside of the corner. Two cable tray section extrusions 90 and 92 are each cut at a 45° angle at their respective butting ends 94, 96. Their outward ends at their outer walls 50 may be topped by a U-shaped clip over the walls, or the illustrated L-shaped coupling strip 102 made of strip 86 bent at 90° along its length may be disposed, with the one panel of the L in the slot 54 of one extrusion and the other panel in the slot 54 of the neighboring extrusion. Where the cable tray turns an external corner and is on the outside of the corner, the outer walls 50 are on the outside of the turn, rather than on the inside. An L-shaped coupling strip like 102, but bent in the opposite way, can be used there too.

In a second, alternate embodiment of FIG. 11, instead of being an extrusion, the elongate cable tray section 110 is made from a single length of sheet metal, which is bent into the desired cable tray section shape, with bends producing the inner wall 112, the floor 114 and the opposite outer wall 116, as well as the wall or mounting surface contacting external wall 120 and, projecting beneath that, the supporting leg 122 and the inclined strut 124 which is spot welded at 127 to the underside of the floor 114. The upper end of the outer wall 116 is crimped over at 117 into a hem, and the cover 60 engages that. This sheet metal cable tray section requires additional forming steps and is not simply an extrusion. Still, it is easy to fabricate, light in weight and uses little materials and little direct labor in its fabrication.

An alternate embodiment of FIG. 13 is a modification of that sheet metal design shown in FIG. 11 and described above. The illustrated cable tray section 150 has the inner wall 152, the floor 154 and the outer wall 156 having the hem 157 at its top edge. Instead of having an open space between the inner wall 112 and the external wall 120, as in FIG. 11, in the cable tray section 150 of FIG. 13, the external wall 160 is bent outward at 162 to meet the inner wall 152, and those walls are spot welded together. Below the outwardly indented external wall 162, that wall again moves inwardly at inclined section 164, bends around at bend 166 and extends at strut 168 to the intersection 172 where the strut 168 is spot welded to the underside of the floor 154.

Although the sheet metal design of FIG. 13 is more difficult to fabricate than the embodiment of FIG. 11, it offers greater stiffness in the wall mounting section due to the sloping surfaces 160, 164 cooperating with the strut 168. In particular, the design of the top 174 of the wall mounting section is stiffened by its small enclosed shape to resist collapse of the walls of that section when a screw, like screw 72 of FIG. 7, is tightened against the upper section 174 to fasten it to a wall, or the like.

Yet another alternate embodiment of FIGS. 7 and 12 combines the extrusion of the first embodiment with an additional tray extension which permits the extruded cable tray section to have various selected widths, while still using only a single width base extrusion.

To this end, the extrusion 126 includes the wall mounting section 12 and only part, but not all, of the floor 40. The extrusion extends outward beyond the junction 45 between the support leg 46 and the floor 40 of the extrusion, but ends usually short of where the outer wall 50 would be expected to be placed. As a result, the extrusion is open on the outward side. This enables an insert, which is of any selected width, to be installed.

In this embodiment of cable tray section extrusion 126, there is installed in the slot 42, and sitting atop the floor 40, an L-shaped, metal extension 130, which may be extruded separately or may be a bent strip of metal. That extension includes its own floor 132 and an upstanding outer wall 134 of corresponding design to the outer wall 50 of FIG. 1 or the outer wall 116 of FIG. 11. In FIG. 7, the top of wall 134 is crimped over in a hem 135. The inward end or edge portion 136 is bent up at 137 to key into and is inserted into the upwardly hooked slot 42. The height and profile of the slot 42 are selected with respect to the inward end 136 so that there is a fit between them which holds the cable tray extension 130 in the slot 42 against undesired extraction, while permitting manual insertion and removal. There may be an additional screw connection 138 between the extrusion 126 below and the extension 130 above at intervals along the extruded length of the cable tray section for holding the cable tray section firmly together. The end 136 of the extension 130 in the slot 42 supports the tray extension so that when cable weighs down the extension 130, the weight will not tip up the extension and loosen it, as the wall mounting section 12 supports the cable tray and its extension.

FIGS. 15 and 16 illustrates a variant based upon the embodiment of FIG. 7, which permits the cable tray section to be of various widths between the inner wall of the cable tray section and the outer wall thereof. As many elements in the embodiments shown in FIG. 15 correspond to those in FIG. 7, only new or additional features are discussed and elements will be identified by reference numerals raised by 200 from the numbers in FIG. 7. The wall mounting section 212 is like that illustrated in the embodiment of FIG. 1. It includes the inner wall 214 of the tray section. The floor 240 of the cable tray section does not have a single slot 42. Instead, it has a plurality of depressions which define a plurality of slots 236, 237, 239 located at spaced intervals starting just outward of the inner wall 214 and extending out to just short of the outer edge 241 of the floor 240. Each slot 236, 237, 239 is generally L-shaped for receiving a correspondingly shaped flange preferably located at the edge of the second part 330 of the cable tray section. One leg of the L descends below the floor surface and the other leg projects inwardly toward the inner wall 214 of the section.

The external wall 244 descends to its bottom end, where it meets the outwardly extending strut 246, which is inclined up from the bottom of the wall section 244 and extends into contact within the underside of the floor 240 just inward of the end 241. To strengthen the strut 246, there is intermediate its length a rib 247 which extends down from the underside of the part of the floor defining the slot 237 to the strut, joins the strut and rigidifies it. There is a further rib 249 further outward along the floor 240 which also joins the floor 240 on the strut 246 for together strengthening them.

The generally L-shaped cable tray section having the wall mounting section and floor 240 is preferably a single extrusion. Holes may be punched in it at particular locations for securement of the L-shaped extension 330, as described below.

The extension 330 may be a metal extrusion or a plastic extrusion or may be a bent strip of metal or plastic, as the particular embodiment requires. The floor 332 of the extension is of a minimum selected width from the free inward portion 331 of the floor 332 to the upstanding outer wall 334. When the extension 330 is in the solid line position illustrated in FIG. 15, it is in the furthest position away from the inner wall 214. The inward portion 331 of the floor 332 of the extension 330 is not straight, but is rather "S" shaped, defining a tab or flange adapted to the shape and position of a selected L-shaped slot 236, 237 or 239 in which the tab or flange is removably positioned. Selection of the respective slot for positioning of the tab or flange 331 determines the width of the cable tray section between the inner wall 214 of the mounting section and the outer wall 334 defined by the upstanding leg of the L-shaped extension 330. The top 335 of the leg 334 may be bent over to receive a coupling strip 86 for joining the outer walls 334 of adjacent cable tray sections.

For securing the L-shaped extension 330 to the cable tray section floor 240, the coupling between the tab or flange 331 and one of the slots, plus the resting of the extension floor 332 on the tray section floor 240 may suffice. In addition, an appropriate nut and bolt combination, rivet, or the like, 338 may be provided for securing the floors 332 and 240, thereby locking the cable tray section extension to the main section thereof. This is especially useful when the extension 330 is in the location furthest outward, that is to the right in FIG. 15, because there is less overlapping surface between the floors 332 and 240.

A cover 260 may be disposed over the cable tray section. The width of the cover would be selected so that it extends the distance between the wall mounting section and the top of the outer wall 334 wherever that might be located.

Any of the slots 236, 237, 239, etc., may receive a cable tray divider strip 350, which comprises an upstanding wall having at its bottom end an L-shaped piece 352 that fits within the respective slot and an S arrangement like 331. A divider so placed would separate the cable tray section into two compartments at each side of the installed divider strip.

Modifications of various elements, particularly in the regions of the wall mounting section and in the strut or rigidification of the floor 240, as shown in any of the other embodiments, may be incorporated in or substituted in the embodiment of FIG. 15.

Although the present invention has been described in connection with a plurality of preferred embodiments thereof, many other variations and modifications will now become apparent to those skilled in the art. It is preferred, therefore, that the present invention be limited not by the specific disclosure herein, but only by the appended claims.

What is claimed is:

1. A section of a cable tray for being mounted to an upstanding surface, the cable tray section comprising an upstanding wall mounting section for being attached to an upstanding surface and a tray floor for supporting cable placed on the tray floor, the tray floor being attached to the wall mounting section and extending transversely to it and away from the wall mounting section in an outward direction;

the cable tray section having opposite longitudinal ends, each end adjoining the end of an adjacent cable tray section, for defining an elongate cable tray of a plurality of the cable tray sections;

the wall mounting section having a top part above the floor, the top part having an external wall for being mounted to the upstanding surface to which the cable tray section is to be attached; means for mounting the external wall to the upstanding surface; the wall mounting section having an internal wall spaced outward from the external wall and also facing outward from the wall mounting section toward the tray floor, the external wall and the internal wall being attached integrally to each other and being spaced apart for defining a hollow interior space of the wall mounting section, whereby the external wall and the internal wall define a truss for stiffening the wall mounting section; the internal and external walls extending down to the tray floor;

the wall mounting section having opposite ends, the hollow interior spaced of the wall mounting section being shaped for receiving a splice shunt block which extends into the hollow interior space at the adjacent ends of neighboring cable tray sections;

an additional support for the cable tray section and integrally formed with the cable tray section, the additional support comprising; an integral extension of the wall mounting section extending below the tray floor; an additional strut connected integrally to the extension below the floor, extending outward from the extension and extending beneath the floor, and being spaced from the floor and extending up to contact the underside of the floor outward from the internal wall, so that the additional support is shaped for extending partway across the floor to strengthen the floor, and the additional support cooperates with the tray floor to provide a truss support for stiffening the floor;

the wall mounting section, the additional support and the tray floor being integral for the truss support of the floor to transfer the load to the truss of the wall mounting section to prevent deformation of the tray floor, of the wall mounting section and of the location where they meet.

2. The cable tray section of claim 1, further comprising a rib extending between the additional strut and the underside of the floor and located between the wall mounting section and the contact of the additional strut with the underside of the floor, whereby the additional support provides truss-like support to the floor.

3. The cable tray section of claim 1, further comprising an outer upstanding wall, upstanding from the floor and opposite and spaced from the wall mounting section and defining an enclosure in the cable tray section between the wall mounting section, the upstanding outer wall and the floor for supporting cable.

4. The cable tray section of claim 3, further comprising the wall mounting section and the outer wall each having a top edge at the top above the tray section floor; a cover removably positionable over the top edges of the wall mounting section and the outer wall for closing off the top of the cable tray.

5. The cable tray section of claim 4, further comprising a respective flange bulging outwardly from the top edge of the mounting wall section and from the top edge of the outer wall section, the cover comprising a clip-on cover having clips removably snappable over the respective flanges at the top edges of the wall mounting section and of the outer wall.

6. The cable tray section of claim 6, further comprising a cover flange extending out from the cover beneath one of the clips for being manually engaged to lift the cover and separate the respective clip from the respective flange.

7. The cable tray section of claim 5, wherein the wall mounting section cover mounting flange is indented to be spaced in from the wall mounting external surface for providing clearance for installation and removal of the cover.

8. The cable tray section of claim 3, further comprising an additional flange at the outer wall toward the top end thereof above the floor, the flange being shaped for defining a slot for receiving a connector piece at the opposite ends of the cable tray section for adjoining the outer walls of adjacent ones of the cable tray sections.

9. The cable tray section of claim 3, further comprising the outer wall having a top edge; near the top edge of the outer wall, near the ends of the cable tray section, means for connecting the adjacent ends of the outer walls of adjacent cable tray sections.

10. The cable tray section of claim 3, wherein the wall mounting section external wall is indented outward from the location of the external wall at the top part of the wall mounting section, and the hollow space for a splice shunt block being defined between the indented external wall and the inner wall of the wall mounting section.

11. The cable tray section of claim 10, further comprising a splice shunt block extending into the hollow space and shaped to be supported by the indented external wall and the inner wall; the splice shunt block extending out of the end of the tray section for insertion into the hollow space of the adjacent tray section.

12. The cable tray section of claim 3, wherein the additional support extends to the tray floor between the wall mounting section and the outer wall.

13. The cable tray section of claim 1, further comprising a splice shunt block extending into the hollow space and shaped to be supported by the material of the wall surrounding the hollow interior; the splice shunt block extending out of the end of the tray section for insertion into the hollow space of the adjacent tray section.

14. The cable tray section of claim 13, wherein the splice shunt block includes removal prevention means on a side thereof for insertion into the hollow interior of one of the cable tray sections for preventing removal of the splice shunt block from such hollow interior.

15. The cable tray section of claim 13, further comprising means connecting the upper edge at the outer wall to an adjacent outer wall of the adjacent cable tray section.

16. The cable tray section of claim 1, further comprising a slot defined above the floor of the section and beneath the wall mounting section for receiving there a flange of an additional extension disposed in the cable tray section.

17. The cable tray section of claim 16, further comprising an additional extension for completing the cable tray section, the additional extension including a floor part for being disposed on the floor of the cable tray section, the floor part of the extension including a flange for being disposed in the slot beneath the wall mounting section for being supported there; the extension including an upstanding section, upstanding from the floor part thereof for defining the outer wall of the cable tray section.

18. The cable tray section of claim 17, wherein the flange is at the edge of the extension and is hook shaped and extends upwardly and the slot is correspondingly shaped for receiving the hook shaped edge and for blocking extraction of the hook shaped edge.

19. The cable tray section of claim 1, further comprising an additional extension for completing the cable tray section, the additional extension including a floor part for being disposed on the floor of the cable tray section, the extension including an upstanding section, upstanding from the floor part thereof for defining the outer wall of the cable tray section, wherein the inner wall of the wall mounting section, the floor part of the additional extension and the upstanding wall of the additional extension comprise a receptacle for cable.

20. The cable tray section of claim 19, further comprising a slot at the cable tray section floor below the wall mounting section;

the extension including a flange on the part for being disposed in the slot beneath the wall mounting section for being supported there.

21. The cable tray section of claim 1, further comprising an additional extension for completing the cable tray section, the additional extension including a floor part for being secured at the floor of the cable tray section; the extension including an upstanding section, upstanding from the floor part thereof for defining an outer wall of the cable tray section.

22. The cable tray section of claim 21, further comprising at least one slot defined in the floor of the cable tray section for receiving there a flange of the floor part of the additional extension; the floor part of the additional extension having a flange removably positionable in the at least one slot for completing the cable tray section.

23. The cable tray section of claim 21, wherein there are a plurality of the slots in the cable tray section floor at spaced intervals outward from the inner wall; the floor part of the extension having a flange positionable in a selected one of the slots, thereby for selecting different widths for the cable tray section between the inner wall and the outer wall thereof.

24. The cable tray section of claim 23, wherein the slots in the cable tray section floor comprise generally L-shaped recesses therein and the flange on the floor part of the additional extension is generally S-shaped for being fitted in the L-shaped slot and being secured to the cable tray section floor by the L shape of the slot.

* * * * *